United States Patent [19]
Johnson et al.

[11] Patent Number: 5,640,605
[45] Date of Patent: Jun. 17, 1997

[54] METHOD AND APPARATUS FOR SYNCHRONIZED TRANSMISSION OF DATA BETWEEN A NETWORK ADAPTOR AND MULTIPLE TRANSMISSION CHANNELS USING A SHARED CLOCKING FREQUENCY AND MULTILEVEL DATA ENCODING

[75] Inventors: Howard W. Johnson, Woodinville, Wash.; Sandeep Patel, Cupertino, Calif.; J. R. Rivers, Santa Clara, Calif.; William Paul Sherer, Sunnyvale, Calif.

[73] Assignee: 3Com Corporation, Santa Clara, Calif.

[21] Appl. No.: 296,577

[22] Filed: Aug. 26, 1994

[51] Int. Cl.$^6$ .................................................. G06F 13/00
[52] U.S. Cl. .............. 395/881; 395/200.01; 395/200.13; 395/200.19; 395/849; 371/47.1; 371/56; 375/279; 375/286; 375/293
[58] Field of Search .......................... 341/95; 370/84; 371/55; 375/286, 281; 395/200.2, 881

[56] References Cited

U.S. PATENT DOCUMENTS

| | | | |
|---|---|---|---|
| 3,139,615 | 6/1964 | Aaron | 340/347 |
| 3,344,352 | 9/1967 | Daguet | 325/38 |
| 3,571,794 | 3/1971 | Tong | 340/146.1 |
| 3,723,880 | 3/1973 | Van Gerwen | 325/38 A |
| 3,754,237 | 8/1973 | de Laage de Meux | 340/347 DD |
| 3,924,186 | 12/1975 | Gordy et al. | 375/281 |
| 4,074,074 | 2/1978 | Boutmy et al. | 179/15 BW |
| 4,087,642 | 5/1978 | Jessop et al. | 179/15 BM |
| 4,092,595 | 5/1978 | Weir et al. | 325/38 |
| 4,631,428 | 12/1986 | Grimes | 307/475 |
| 4,910,750 | 3/1990 | Fisher | 375/19 |
| 4,980,897 | 12/1990 | Decker et al. | 375/38 |
| 5,166,956 | 11/1992 | Baltus et al. | 375/286 |
| 5,220,561 | 6/1993 | Nuhn et al. | 370/84 |
| 5,235,617 | 8/1993 | Mallard, Jr. | 375/17 |
| 5,396,503 | 3/1995 | Thaler et al. | 371/55 |
| 5,410,309 | 4/1995 | Jedwab et al. | 341/95 |
| 5,446,914 | 8/1995 | Paul et al. | 395/800 |
| 5,479,617 | 12/1995 | Nei | 395/200.2 |
| 5,513,377 | 4/1996 | Capowski et al. | 395/881 |

*Primary Examiner*—Thomas C. Lee
*Assistant Examiner*—Po C. Huang
*Attorney, Agent, or Firm*—Townsend and Townsend and Crew, LLP

[57] ABSTRACT

Binary data is transmitted to a network physical layer from a media access controller as a series of multibit nibbles and is encoded into a multi-level data stream and split among a number of transmission channels, thereby reducing the signal frequency necessary to carry the data on each one of the transmission channels. The multi-level signal is then translated at a receiver back into a binary data stream. In a specific embodiment, the symbol transmission frequency on each of the transmission channels is at the same frequency as the nibble transfer rate between the media access controller and the physical layer.

18 Claims, 4 Drawing Sheets

METHOD AND APPARATUS FOR SYNCHRONIZED TRANSMISSION OF DATA BETWEEN A NETWORK ADAPTOR AND MULTIPLE TRANSMISSION CHANNELS USING A SHARED CLOCKING FREQUENCY AND MULTILEVEL DATA ENCODING

BACKGROUND OF THE INVENTION

The present invention relates generally to transmission of data in a network. More particularly, the present invention relates to the transmission of signals over unshielded twisted pair transmission lines in a local area network in accordance with an improvement to IEEE Standard 802.3 (Ethernet).

Recent years have seen the rapid advance of networking of data processing systems in offices, educational institutions, and other environments. In response to a felt need for a widely adopted standard for interoffice communication, several industry groups and the IEEE adopted IEEE Standard 802.3 (Ethernet) for data transmission over unshielded twisted-pair at speeds up to 10 million bits per second (Mbps). The 10 Mbps transmission rate was accomplished by sending binary signals over wires at up to 20 Mhz, with the higher speed allowing for data buffering, error-checking and self clocking. The 802.3 standard has been widely adopted, resulting in a large installed base of hardware capable of transmitting 20 Mhz signals in office computer environments over unshielded twisted pair (UTP) wires. Part of this installed base of existing hardware is existing UTP wiring in many offices and educational institutions. Much of this UTP wiring is rated Category 3 by the Electronic Industries Association. Category 3 wiring is capable of carrying signals at frequencies up to approximately 30 Mhz. At higher frequencies, there is too much signal dispersion in Category 3 wiring and there is too much signal leakage from the wires. Among other problems, signal leakage results in RF interference that violates regulations of the Federal Communication Commission.

Ever increasing advances in computer technology as well as a desire to transmit graphics, video and other high bandwidth data over office computer networks have created a need for higher speed data transmission. Responding to this need, the IEEE in 1992 began to develop a standard for a local area network capable of transmitting data at 100 Mbps. According to this new proposed standard, data will be transferred from a media access controller to a physical layer transceiver as 4-bit nibbles at a clock speed of 25 Mhz and this data will be transmitted over the network at an effective data rate of 100 Mbps.

With the data rate of 100 Mbps set as a goal, the question arises of how to transmit the 100 Mbps of data to a remote receiver. The most straightforward method would be to increase the frequency on the channel carrying the data to something over 100 Mhz, thereby allowing for simple binary transmission of a 100 Mbps signal. However, as discussed above, the large installed base of UTP wires cannot handle signals at that high a frequency.

There are several known methods for transmitting a high binary data rate (like 100 Mbps) at a lower effective transmission frequency. One method reduces the frequency necessary to transmit a binary 100 Mbps signal by translating the binary signal to a signal with 5 or 6 discrete voltage levels before transmission. Signals with multiple voltage levels can inherently carry more data per clock period than a binary signal and so a lower frequency transmission signal may be used. Another known method divides up the data over multiple twisted pair cables, thereby reducing the signal on any one twisted pair while maintaining a higher overall data rate.

Both of these methods have a number of known disadvantages. A major source of these disadvantages is due to the fact that the clock speed at which data is transmitted between the network station and the network adaptor is different from the clock speed used by the adaptor to transmit data on the network. These two separate clock frequencies require two separate clock circuits and require that at least one of the circuits has a phase-lock-loop or other circuitry to keep the two clocks in alignment. Additionally, a network interface system using two different clock frequencies may need to provide some means of transferring data from one clock domain into the other. This transferal process takes additional time and may increase the access latency between the station and the network.

What is needed is a networking solution capable of transmitting binary data at a rate of 100 Mbps over existing office network transmission lines that avoids the problems inherent in interfaces using two different clock frequencies.

SUMMARY OF THE INVENTION

According to the present invention, binary data is transmitted from a media access controller to a network physical layer interface circuit as a series of multibit nibbles. This data is encoded into a multi-level data stream and split among a number of transmission channels, thereby reducing the signal frequency necessary to carry the data on each one of the transmission channels. The multi-level signals on the multiple channels are translated at the receiver back into a binary data stream and recombined. In a specific embodiment, the transmission frequency on each of the transmission channels is at the same frequency as the nibble transfer rate from the media access controller to the physical layer.

In a specific embodiment, the invention transmits ternary-coded (three-level) data on multiple unshielded twisted-pair wires using an encoder that translates 8-bit data words into a sequence of ternary code words, thereby reducing the number of symbols that must be transmitted by 25% and includes a data splitter that splits the data over three twisted pair wires. A specific network system built according to the invention places a ternary signal on each of three twisted pair wires at a frequency that is 25% that of the incoming bit rate. The present invention therefore provides an effective data transmission rate of 100 Mbps while transmitting ternary symbols that are limited to 25 Mhz. A further advantage of the invention is that the network transmission circuitry can share the clock signal with the data interface circuitry thereby eliminating the need for clock synchronization circuitry or data buffering between the user interface and the network interface. In a specific embodiment, this last advantage is accomplished by having data clocked to the network interface in 4-bit nibbles at a 25 Mhz clock speed In one embodiment, the invention uses binary to ternary data conversion (a particular scheme of which is the subject of related co-pending application, Ser. No. 08/2148934). Binary to ternary conversion has long been recognized as being beneficial for transmission of a data signal on an electromagnetic channel. The three possible voltage levels (positive, negative, and zero, sometimes represented as the digits +,−, and 0) of a ternary symbol inherently carry more data than the two voltage levels of a binary bit. For example, six binary bits can represent only $2^6$ or 64 different values, whereas six possible ternary symbols can represent $3^6$ or 729 different values.

A specific embodiment of the invention was included in a proposal (the 4T+ Media Specification) dated Sep. 28, 1993, to the IEEE 802.3 High-Speed Study Group by the Fast Ethernet Alliance. The Fast Ethernet Alliance is a non-sanctioned technical group of the IEEE that includes as members the inventors of the present invention.

The invention will be understood more completely upon reference to the following detailed description in connection with the accompanying drawings.

DETAILED DESCRIPTION OF SPECIFIC EMBODIMENTS

In the following description numerous specific details are set forth, such as specific numbers, registers, addresses, times, signals, and formats, etc., in order to provide a thorough understanding of the present invention. However, it will be apparent to one skilled in the art that the present invention may be practiced without these specific details. In other instances, well-known circuits and devices are shown in block diagram form in order not to obscure unnecessarily the present invention.

Figure 1:
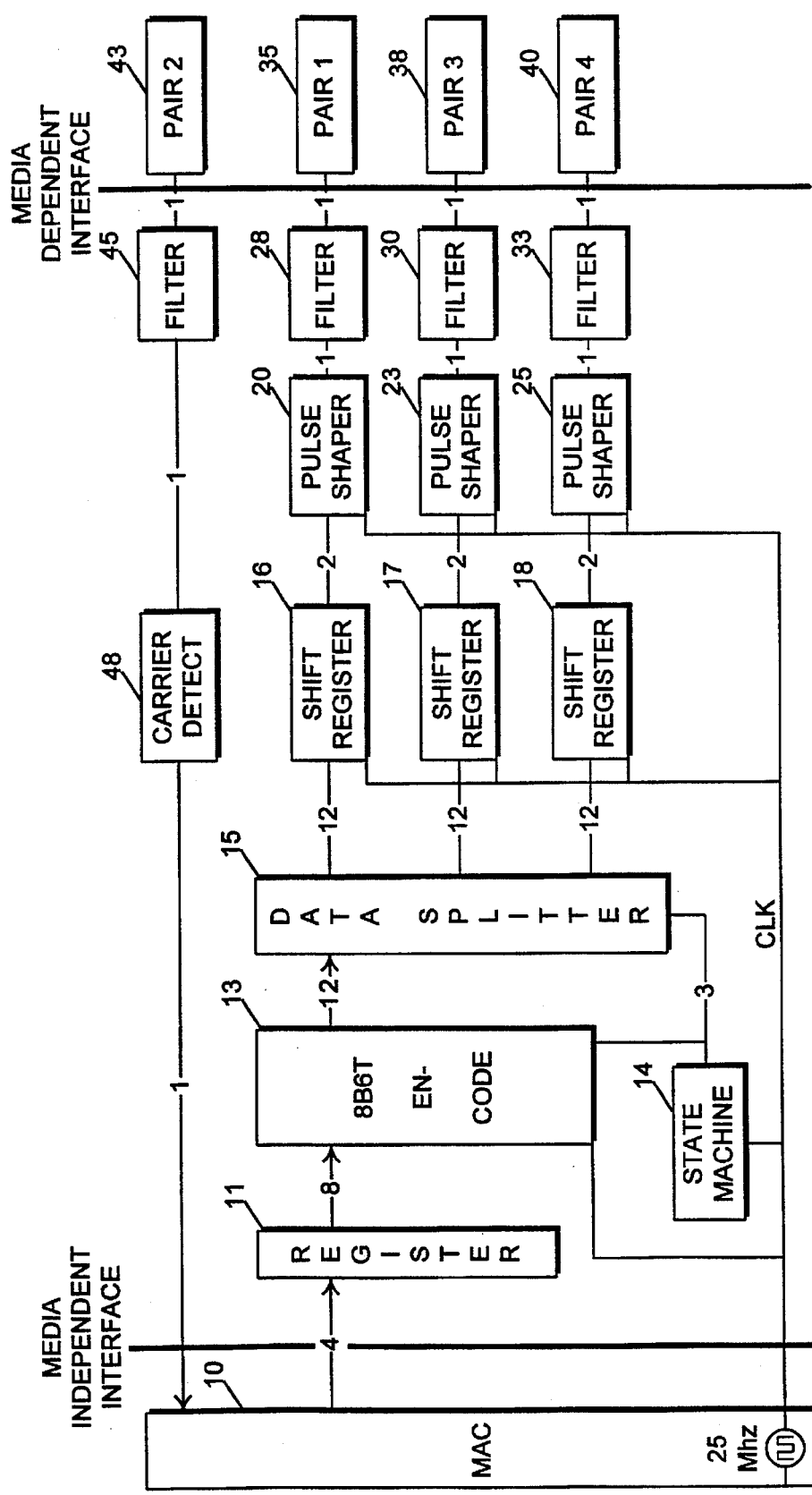
FIG. 1 is a block diagram of a data transmission system according to the invention.

FIG. 1 shows a data transmission system built according to the present invention. Some aspects of this transmission system were discussed in the Fast Ethernet Alliance's 4T+ Media Specification proposal discussed above. The system is designed to use four twisted-pair transmission lines for data exchange. During a data transfer, data is transmitted over three of the transmission lines, and the fourth line is monitored by the transmitter so as to detect a collision. The system contains a Media Access Controller (MAC) 10, which is connected to the system bus (not shown) of a computer or other data processing unit. MAC 10 receives data from the system bus during transmission. In the Fast Ethernet Alliance proposal, the MAC is specified to output that data as 4-bit nibbles at a clock rate of 25 Mhz, giving an effective bit rate of 100 Mbps.

The 4-bit nibbles from MAC 10 are received by an 8-bit register 11. Register 11 receives two nibbles and then makes the resulting 8-bit data word available to 8B6T encoder 13. The encoder encodes the 8-bit data word and outputs a 12-bit binary coded ternary (BCT) code word, which represents a 6T code group, to data splitter 15. Operation of data splitter 15 is controlled by state machine 14 which is connected to the MAC's clock and which provides a simple sequential 3-bit select signal to data splitter 15 and encoder 13. The data splitter time de-multiplexes the 12-bit code words among three shift registers 16, 17, and 18 in a round robin fashion in response to the 3-bit select signal from state machine 14. These shift registers shift out 2-bits (representing one ternary symbol) of the 12 bit BCT code words every clock cycle to transmission pulse shapers 20, 23, and 25. The pulse shapers generate pulses in response to their inputs and these pulses are transmitted through filters 28, 30, and 33 onto twisted pairs 35, 38, and 40.

Collision detect and carrier detect in this system are accomplished over a forth twisted pair 43 in a way well understood in the art. While the system is transmitting, twisted pair 43 is monitored through filter 45 by carrier sense detector circuit 48. If a carrier is detected by circuit 48 while the transmitter is transmitting, circuit 48 sends a signal to MAC 10 alerting it to a collision and MAC 10 processes the collision.

Figure 2:
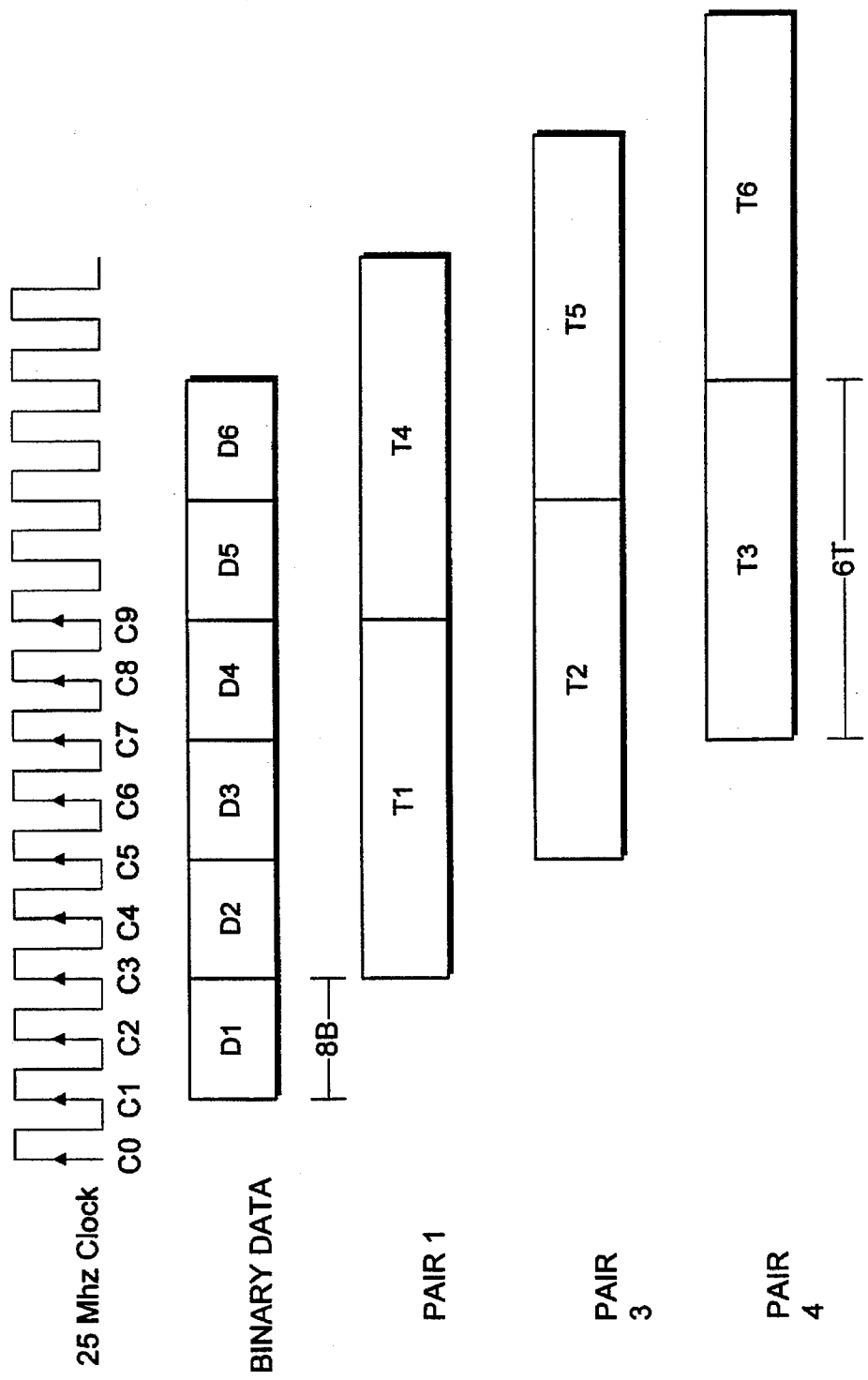
FIG. 2 is a timing diagram of data transmission according to the invention.

FIG. 2 is a timing diagram of data propagation from binary input at encoder 13 to three-channel ternary output at UTPs 35, 38, and 40 according to the invention. Binary data bytes are represented by the labels D1, D2, D3, D4, D5 and D6. According to the invention, these binary data bytes are translated into 6T code groups T1, T2, T3, T4, T5 and T6. At the rising edge of clock cycle C0, the first nibble of a binary data byte is clocked into register 11. At C1, the second nibble is clocked into register 11 and a short time thereafter the first data byte, D1, is made available to encoder 13. Within two 25 Mhz clock cycles, D1 has been encoded by encoder 13, directed by data splitter 15 to the correct shift register 16, and made available to wave shaper 20. For each 8-byte data word, such as D1, wave shaper 20 will output a 6T code group, such as T1. For data word D1, wave shaper 20 begins to output an appropriate ternary pulse for the first trit of the 6-trit ternary code T1 on twisted-pair 1 just after the beginning of a third clock cycle (C3). Wave shaper 20 outputs one ternary symbol each clock cycle, so output of T1 takes a total of six clock cycles.

At the time that wave-shaper 20 is beginning to output the first trit of T1, a second data word, D2, is made available to encoder 13 and, within two more clock cycles, it is encoded and begins to be output by wave-shaper 23 on pair 3. Data bytes continue to propagate through the adaptor and are transmitted in this fashion so long as there is binary data to be transmitted and no collision occurs, with the transmission of each 6T code group taking three times as long as the propagation of the 8-bit byte it represents through the encoder.

This property is a result of the careful selection according to the invention of the number of bits, NB, used to transfer data across the MII, the encoding ratio, ER, (number of encoded symbols out for each bit in), and the number of parallel channels, NC. In the present embodiment these numbers are: NB=4, ER=6/8, and NC=3. In any system where the product of NB and ER divided by NC equals unity, the input transfer rate and the output symbol rate will be the same. The product of NB times ER divided by NC is unity in the present embodiment.

In any system where the product of NB and ER divided by NC equals an integer, the output symbol rate will be an integral multiple of the input transfer rate. For example, using a byte transfer rate (NB=8), with 4B5B encoding (ER=5/4) and five output lines (NC=5) results in an output transfer rate exactly twice the input transfer rate. In this case the input clock is trivially related to the output clock. In any system where NC divided by the product of NB and ER equals an integer, the output symbol rate will be an integral sub-multiple of the input transfer rate. For example, using a one bit transfer rate (NB=1), with 7B5T ternary encoding (ER=5/7), and five output lines (NC=5) results in an output transfer rate exactly one seventh of the input rate. In this case the output clock is trivially related to the input clock.

Another advantage of the invention is that the ternary symbols that are transmitted on the twisted pairs 1, 3, and 4, are transmitted at the same clock frequency as the 4 bit nibbles are clocked out from MAC 10. This allows the encoder/transmitter to use the 25 Mhz clock provided by MAC 10 to clock the ternary pulses out from the wave-shapers. Use of the clock provided by the MAC 10 simplifies the design and circuitry of the encoder/transmitter because there is no need to provide clock generating circuitry on the encoder transmitter and there is also no need for a phase-lock-loop or other circuits that would be necessary to align the phases of the separate clocks if there were a separate clock on the encoder/transmitter circuit.

Figure 3:
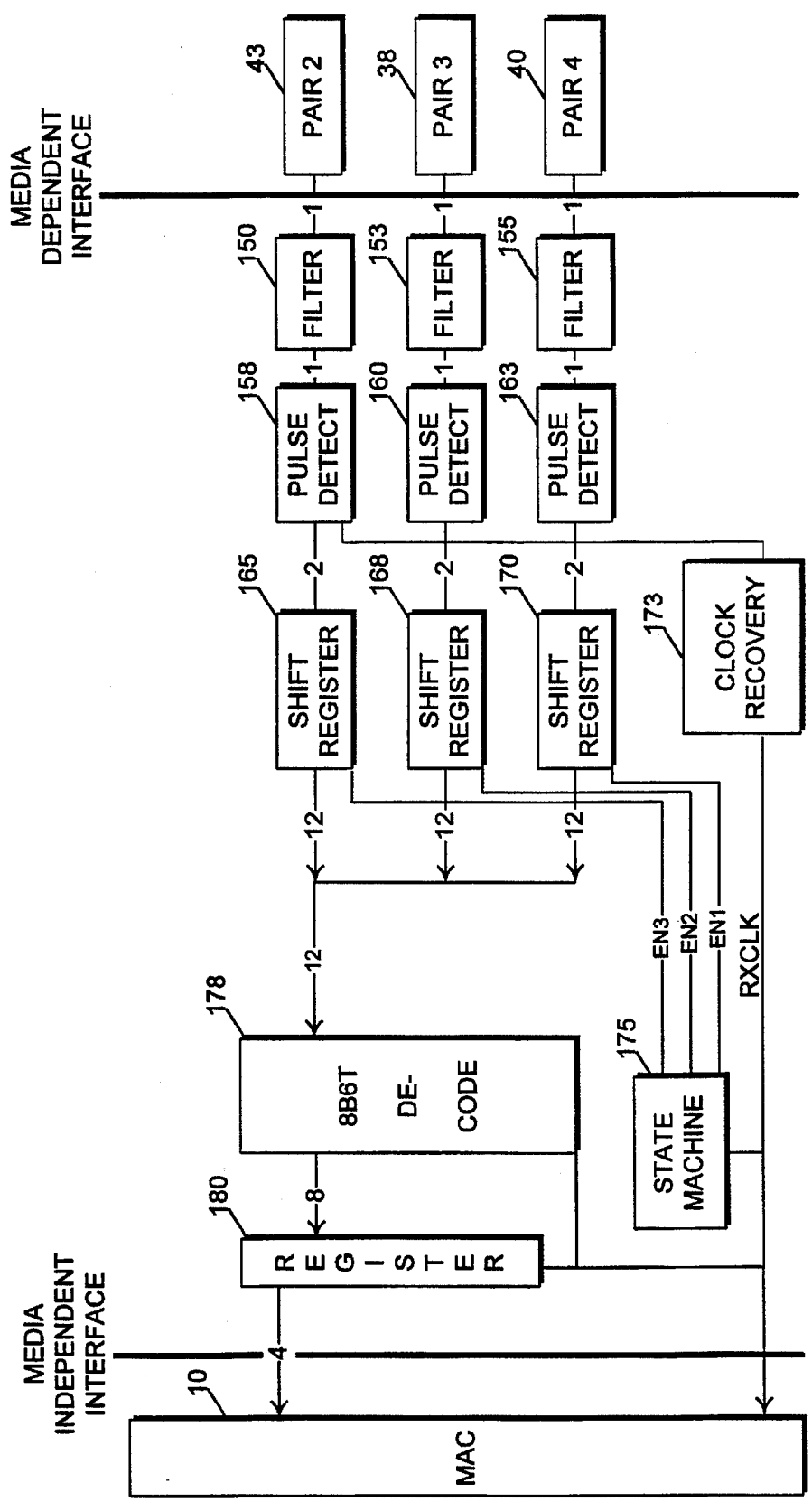
FIG. 3 is a block diagram of a data receiver system according to the invention.

FIG. 3 shows a data receiver system built according to the present invention. This receiver system was also discussed in the Fast Ethernet Alliance's 4T+ Media Specification proposal discussed above. The receiver receives ternary symbols over a total of three twisted-pair transmission lines. Ternary symbol are received over the three twisted pair lines 43, 38, and 40. The received symbols are filtered by filters 150, 153, and 155. The filtered signals are then input into pulse detectors 158, 160, 163. The pulse detectors detect whether there is a positive pulse, a negative pulse, or no pulse on their connected data transmission channel during a clock cycle and output a 2-bit binary code word for each of these pulses. In one embodiment, the filters and pulse detectors act together to correct for any transmission skew introduced due to the varying length of the transmission lines.

The 2-bit output from the pulse detectors is collected by serial-in/parallel-out shift registers 165, 168, and 170. The shift registers reconstruct the transmitted 12-bit BCT codewords. A signal from one of the pulse detectors, 158, is provided to clock recovery circuit 173, which generates a 25 Mhz clock (RXCLK) synchronized to the clock cycle of the recovered data. This clock is provided to MAC 10, which uses it to clock data transfer from register 180.

State machine 175 generates three sequential enable signals EN1, EN2, and EN3, based on the recovered clock which during each clock cycle enables just one of the three shift registers 165, 168, and 170 to output its data to 8B6T decoder 178. Once each 12-bit BCT code word has been decoded to an 8-bit binary data word, the data word is placed in register 180 and is available for transmission to MAC 10 as two 4-bit nibbles clocked by the recovered 25 Mhz clock.

Figure 4:
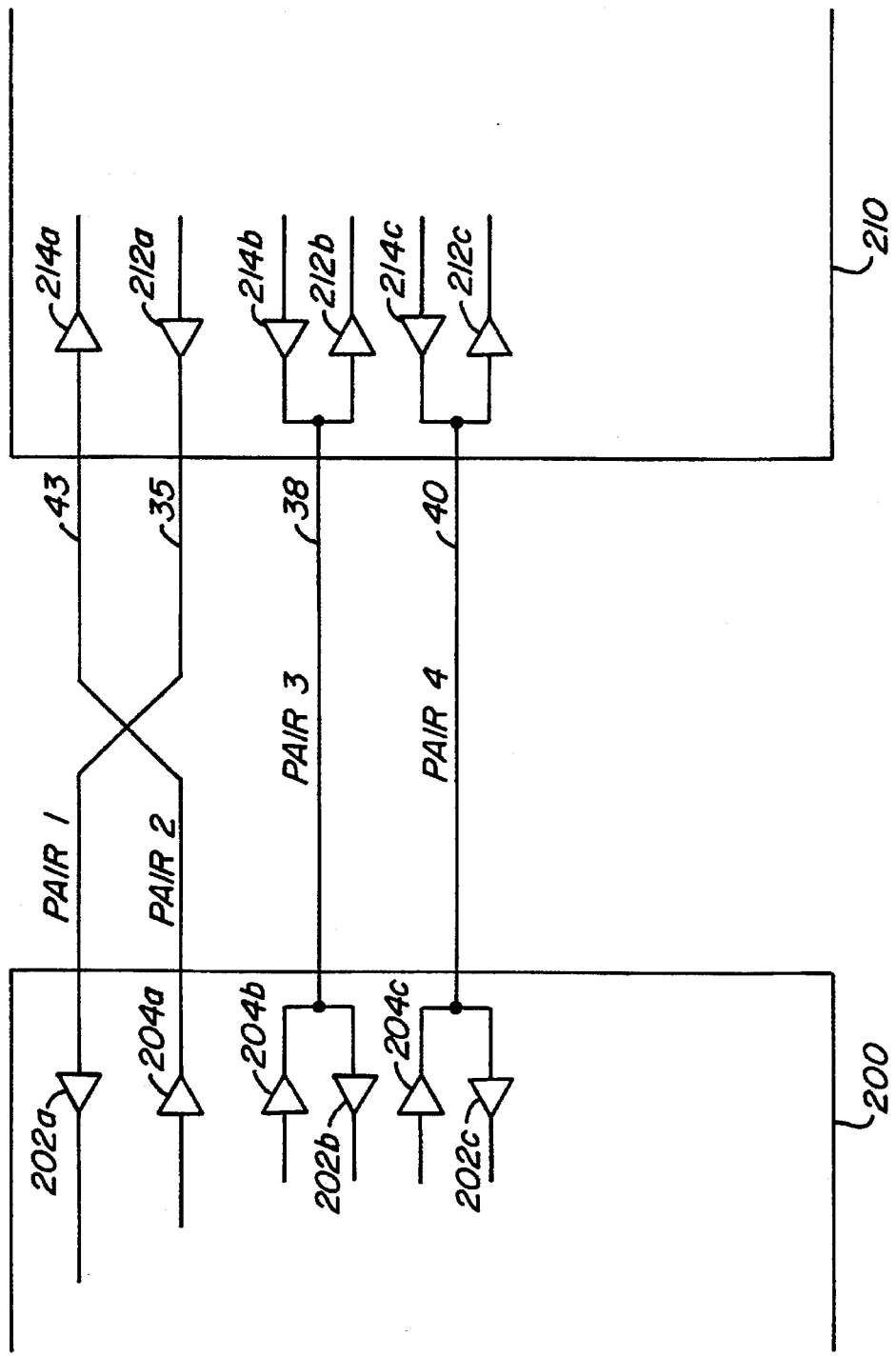
FIG. 4 is a block diagram illustrating the connection of two network adaptors over four transmission lines using a "cross-over" connection according to the invention.

FIG. 4 illustrates the connection of two network adaptors 200 and 210 over four twisted pair transmission lines using a "cross-over" connection according to the invention. Each of the adaptors 200 and 210 includes an encoder/transmitter and a decoder/receiver built according to the invention. In FIG. 4, adaptor 200 is shown with three transmitters 204a–c, corresponding to pulse shapers 20, 23, and 25, and three receivers 202a–c, corresponding to pulse detectors 158, 160, and 163. Adaptor 210 similarly has three transmitters 214a–c and three receivers 212a–c. In the configuration shown in FIG. 4, twisted pairs 3 and 4 act as bidirectional data transmission channels. In contrast, crossed-over twisted pairs 1 and 2 are unidirectional channels. When transmitting data to adaptor 210, adaptor 200 uses pairs 2, 3 and 4 to transmit data while listening for a carrier on pair 1. When transmitting data to adaptor 200, adaptor 210 uses pairs 1, 3 and 4 to transmit data while listening for a carrier on pair 2. This "cross-over" arrangement allows for easy collision detect by the adaptors because during transmission, the unused pair should remain silent. If a transmitting adaptor detects a carrier on the unused twisted pair, the transmitter can assume that the other adaptor has attempted to transmit data. The signals on pairs 3 and 4 in that case will have collided and the data will therefore be corrupted. The transmitting adaptor will therefore halt its transmission and process the collision. Transmission is halted on the bidirectional pairs as soon as a carrier is detected on the unused pair so that the drivers in the two adaptors are not "fighting" one another. Transmission on the unidirectional transmitting pair is halted by the transmitting MAC after enough time has elapsed to insure that all receivers have detected the collision. The "cross-over" arrangement is used in the twisted pairs wires because circuits 200 and 210 will typically be identical adaptor circuits or at least be compatible adaptor circuits with identical physical connectors. With pairs 1 and 2 "crossed", identical adaptors with identical physical connectors can be operated as just described.

According to one implementation of the invention, bidirectional pairs 3 and 4 may also be crossed over. However, this does not change operation of the adaptor circuits with respect to those pairs.

While the above is a complete description of specific embodiments of the invention, various modifications, alternative constructions, and equivalents may be used. Therefore, the above description should not be taken as limiting the scope of the invention as defined by the claims.

What is claimed is:

1. An apparatus for transmitting binary data between a transmitter and a receiver comprising:

a shared transmit clock;

register means for receiving a sequence of binary data clocked at said shared transmit clock;

means for encoding said sequence of binary data into a sequence of code words said code words representative of multilevel data, said means for encoding receiving data clocked at said shared transmit clock;

data splitter means for dividing said sequence of code words among a plurality of transmission channels;

shift-register means for dividing said code words into subparts;

a plurality of wave-shapers for generating multilevel pulses in response to said subparts wherein said pulses are clocked with said shared transmit clock;

a plurality of transmission channels for transmitting said multilevel pulses to said receiver at said shared transmit clock;

a plurality of wave-detectors at said receiver for receiving said multilevel pulses from said transmission channels and generating code words;

means at said receiver for combining said received code words into a sequence of code words; and means at said receiver for converting said code words into a sequence of binary data words.

2. The apparatus according to claim 1 wherein said plurality of transmission channels comprises three transmission channels, said plurality of wave-shapers comprises three wave-shapers, said multilevel pulses are ternary pulses, said code words are binary coded ternary code words, and said plurality of wave-detectors comprises three wave-detectors.

3. The apparatus according to claim 2 wherein said received clock and said shared clock have a frequency of 25 Mhz and wherein said register means for receiving data receives data at a rate of 4 bits every 25 Mhz clock cycle and said transmission channels carry ternary data at a frequency of 25 Mhz.

4. The apparatus according to claim 1 wherein a number of bits clocked at one time into the data receiving means multiplied by an encoding ratio and divided by the number of channels equals one whereby an input transfer rate and an output symbol rate will be the same and wherein the encoding ratio is the ratio of the number of bits in a transmitted code word to the number of bits in a data word.

5. The apparatus according to claim 1 wherein a number of bits clocked at one time into the data receiving means multiplied by an encoding ratio and divided by the number of channels equals an integer whereby an input transfer rate and an output symbol rate are integral multiples of each other.

6. The apparatus according to claim 1 wherein the number of channels divided by the product of a number of bits clocked at one time into the data receiving means and an encoding ratio equals an integer whereby an input transfer rate will be an integral sub-multiple of an output symbol rate.

7. The apparatus according to claim 1 further comprising:
means at said receiver for recovering a clock signal from said transmission channels, said recovered clock signal used to produce a shared receive clock.

8. The apparatus according to claim 2 wherein said plurality of transmission channels further comprises a fourth transmission channel, said fourth transmission channel used for carrier sense/collision detect by said transmitter.

9. A circuit for transmitting and receiving encoded binary data comprising:
means for receiving a shared transmit clock;
register means for receiving a sequence of binary data clocked at said shared transmit clock;
means for encoding said sequence of binary data into a sequence of binary coded ternary code words, said binary coded ternary code words representative of multilevel data;
data splitter means for dividing said sequence of binary coded ternary code words among a plurality of transmission channels;
shift-register means for dividing said code words into subparts;
a plurality of wave-shapers for generating ternary pulses in response to said subparts wherein said pulses are clocked with said shared transmit clock;
a plurality of wave-detectors for receiving said ternary pulses from said transmission channels and generating binary coded ternary code words;
a plurality of bi-directional connectors for receiving and transmitting signals on a subset of said transmission channels;
a data receiver/collision detect connector for receiving data on one of said transmission channels during data receive and for detecting collisions by performing carrier sense on said channel during data transmit;
means for recovering a receive clock from one of said transmission channels;
means for combining received binary coded ternary code words into a sequence of binary coded ternary code words; and
means for converting said binary coded ternary code words into a sequence of binary data words.

10. A method for transmitting binary data as ternary coded data using a shared clock comprising the steps of:
acquiring a first data word in two nibbles wherein the first nibble is acquired during a first clock cycle and the second nibble is acquired during a second clock cycle;
encoding said first data word into a first binary coded ternary code word during a second and third clock cycle;
acquiring a second data word in two nibbles wherein the first nibble is acquired during a third clock cycle and the second nibble is acquired during a fourth clock cycle;
placing said first binary coded ternary code word in a first parallel-in/serial-out shift register at the beginning of a fourth clock cycle and beginning to transmit said code word on a first transmission line during said fourth clock cycle;
encoding said second data word into a second binary coded ternary code word during a fourth and fifth clock cycle;
acquiring a third data word in two nibbles wherein the first nibble is acquired during a fifth clock cycle and the second nibble is acquired during a sixth clock cycle;
placing said second binary coded ternary code word in a second parallel-in/serial-out shift register at the beginning of a sixth clock cycle and placing said code word onto a second transmission line during said sixth clock cycle;
encoding said third data word into a third binary coded ternary code word during a fifth and sixth clock cycle;
placing said third binary coded ternary code word in a third parallel-in/serial-out shift register at the beginning of a eighth clock cycle and placing said code word onto a third transmission line during said eighth clock cycle; and
continuing the method in round-robin fashion for any remaining data words such that after encoding a fourth data word is placed in the first parallel-in/serial-out shift register for output on the first transmission channel, a fifth data word is placed in the second parallel-in/serial-out shift register for output on the second transmission channel, and so on.

11. A method for receiving binary data transmitted on three transmission channels as ternary coded data using a recovered shared clock comprising the steps of:
recovering a clock signal from the transmitted data on a transmission channel;
using said recovered clock signal in three pulse detectors to generate binary data indicating symbols received on the three transmission channels;
using said recovered clock signal to collect the binary data in three serial-in/parallel-out shift registers;
decoding a first data word from a first binary coded ternary code word during a first and second clock cycle and transferring that data word to a receive register at the end of the second clock cycle;
decoding a second data word from a second binary coded ternary code word during a third and fourth clock cycle and transferring that data word to a receive register at the end of the fourth clock cycle;
decoding a third data word from a third binary coded ternary code word during a fifth and sixth clock cycle and transferring that data word to a receive register at the end of the sixth clock cycle; and
continuing the method for any remaining code words.

12. A method for transmitting a plurality of binary data words as ternary coded data in a network using a shared clock comprising the steps of:
accepting a first data word into a register means wherein said register means is triggered by an edge of said shared clock;
encoding said first data word into a binary coded ternary code word such that said binary coded ternary code word is guaranteed available at an edge of said shared clock;

placing a first binary coded ternary code word in a first parallel-in/serial-out shift register and beginning to transmit said code word on a first transmission line wherein said first shift register is clocked by said shared clock;

accepting a second data word into a register means once said first data word has been placed in said first parallel-in/serial-out shift register wherein said register means is triggered by an edge of said shared clock;

encoding said second data word into a second binary coded ternary code word;

placing said second binary coded ternary code word in a second parallel-in/serial-out shift register and beginning to transmit said second code word on a second transmission line while said first code word is being transmitted on said first transmission line wherein said second shift register is clocked by said shared clock;

accepting a third data word into a register means once said second data word has been placed in said second parallel-in/serial-out shift register;

encoding said third data word into a third binary coded ternary code; and placing said third binary coded ternary code word in a third parallel-in/serial-out shift register and beginning to transmit said third code word on a third transmission line while said first and second code words are being transmitted on said first and second transmission lines.

13. A method for transmitting binary data comprising the steps of:

acquiring said binary data in multi-bit nibbles at a first frequency;

encoding said binary data as multilevel data and receiving said data to be encoded using said first frequency;

splitting said multilevel data among a predetermined number of transmission channels;

transmitting said multilevel data on said channels at a second frequency where said second frequency is easily derived from said first frequency;

receiving said multilevel data from said channels; and decoding said multilevel data to recapture said binary data.

14. The method according to claim 13 wherein said transmission channels consists of three transmission channels.

15. The method according to claim 13 wherein said first frequency and said second frequency are substantially equal to 25 Mhz.

16. The method according to claim 13 wherein a number of bits in the multibit nibbles multiplied by an encoding ratio and divided by the number of channels equals one whereby an input transfer rate and an output symbol rate will be the same.

17. The method according to claim 13 wherein a number of bits clocked at one time into the data receiving means multiplied by an encoding ratio and divided by the number of channels equals an integer whereby the input transfer rate and the output symbol rate will be an integral multiple of the output symbol rate.

18. The method according to claim 13 wherein the number of channels divided by the number of bits in the multibit nibbles multiplied by the encoding ratio equals an integer whereby an input transfer rate and an output symbol rate are integral multiples of each other.

* * * * *